United States Patent Office 3,371,128
Patented Feb. 27, 1968

3,371,128
LACTONE POLYMERS DERIVED FROM
3-FERROCENYL PHTHALIDES
Eberhard W. Neuse, Santa Monica, and Edward Quo, Inglewood, Calif., assignors, by mesne assignments, to McDonnell Douglas Corporation, Santa Monica, Calif., a corporation of Maryland
No Drawing. Filed Oct. 6, 1964, Ser. No. 401,982
18 Claims. (Cl. 260—837)

ABSTRACT OF THE DISCLOSURE

Ferrocene containing polymers may be prepared from heating 3-ferrocenyl lactones at temperatures between 115° and 160° C. in the presence of a Lewis acid. Alternately one may heat either 3-hydroxy phthalide or 3-alkoxy phthalide with ferrocene and an acidic catalyst. The mole ratio of the ferrocene to the phthalide is between 0.5 and 2.0. In an example 27.9 parts ferrocene, 15 parts of 3-hydroxy phthalide and 1.4 parts of anhydrous $ZnCl_2$ are heated at 110° C. under $N_2$ for 2 hrs. to give a polymeric product.

---

This invention relates to new iron-organic compounds and methods for their preparation. More specifically, the invention relates to a lactone comprising a dicyclopentadienyl iron (ferrocene) unit and to polymeric materials prepared therefrom. The invention further relates to a process for preparing this lactone and also to a process for preparing polymeric products derived from this lactone.

Ferrocene is known to have high temperature resistance but it is relatively volatile. Recent developments have involved the production of ferrocene polymers which are useful, e.g., as intermediates in the preparation of other materials and as substitutes for ferrocene itself. Such ferrocene polymers have a high temperature stability and they also have the advantage, as compared to ferrocene, of having a much lower volatility. Thus, ferrocene polymers having particular advantages and utility as materials of high temperature resistance and high temperature stability are disclosed in the copending applications of Eberhard W. Neuse, Serial No. 233,913, now Patent No. 3,238,185 filed Oct. 29, 1962; Serial No. 308,318, now Patent No. 3,341,495 filed Sept. 12, 1963; and Serial No. 371,732, filed June 1, 1964.

Processes for preparation of polymeric compounds by condensation of suitable monomers have long been known. In general, a feature of such reactions is the participation of two, or more, reactants in the condensation. Another common feature of many such polycondensation reactions is the liberation, during the process, of certain constituents that are split off as a result of the condensation. For instance, water is eliminated during the formation of a polyester by condensation of a diol with a diacid, or during the formation of a polyamide by condensation of a diamine with a diacid. It is usually undesirable to have these split-off byproducts present in the reaction mass, as their complete removal sometimes poses problems. It is, furthermore, frequently undesirable to employ more than one reactant in polycondensation reactions. It is therefore generally preferred to employ such reactions that involve only one reactant rather than several.

In addition, it is frequently preferred to use such compounds as starting materials which are already devoid of the elements of the split-off byproduct, thus merely resulting in rupture of certain intramolecular bonds and subsequent formation of intermolecular bonds of either the same or a different kind (a polyaddition rather than a polycondensation). For illustration, while in the polycondensation of, e.g., ethylene glycol with terephthalic acid to form a polyester, the reaction involves two compounds as starting materials, the polycondensation of ε-amino caproic acid involves only one reactant as starting material. But even in the latter reaction, the formation of the resulting nylon polymer is accompanied by the liberation of water.

It is accordingly one object of this invention to provide novel ferrocene compounds which are readily capable of undergoing self-condensation to produce novel ferrocene polymers having wide utility, e.g., as coatings, adhesives and the like.

A further object of the invention is the provision of a ferrocene compound and polymers derived therefrom which contain the lactone ring.

A still further object is the provision of polymeric compounds obtained from a ferrocene compound containing a lactone ring, by self-condensation of such compound or by reaction of such compound with an additional reactant.

A still further object is to provide polymeric compounds obtained from a ferrocene compound containing a lactone ring, such reaction for producing said polymeric compounds, when properly catalyzed, requiring no additional reactants and proceeding essentially without splitting off water or any other volatile byproducts.

Still further objects of the invention are the provision of a process for the preparation of the above-noted novel ferrocene compounds containing a lactone group, and a process for providing polymeric products derived from such lactone.

Other objects and advantages of the invention will appear from the following description of the invention.

The objects and advantages noted above are achieved according to the invention by the provision of an intramolecular ester of ferrocene referred to herein as a 3-ferrocenyl lactone and having the formula noted below:

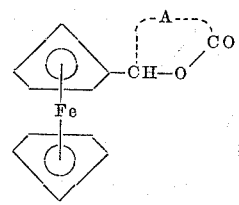

I

In formula I above, A represents the atoms necessary to complete a five membered lactone ring. Thus, for example, the value A in Formula I can represent two adjacent carbon atoms forming the carbon atoms of an aromatic radical such as a phenyl or naphthyl ring, and substituted phenyl and naphthyl rings, e.g., containing alkyl substituents such as methyl, ethyl, propyl, isopropyl, and the like, said aromatic radical containing up to about 16 carbon atoms, or A can be adjacent carbon atoms of an aliphatic radical such as the divalent radical $-CH_2CH_2-$. Specific compounds under Formula I above, according to the invention, are the 3-ferrocenyl phthalide and the gamma ferrocenyl butyrolactone, having the Formulae Ia and Ib noted below:

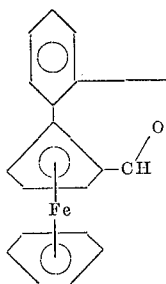 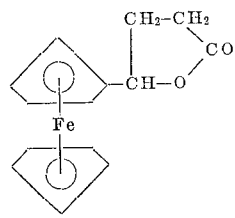

Ia                    Ib

The preferred and more useful compound, according to the invention is that of Formula Ia above, referred to herein as 3-ferrocenyl phthalide, particularly for the production of polymeric compounds according to the invention. From compound Ia, other ferrocene derivatives and polymers of wide utility, as noted hereinafter, can be readily obtained by procedures set forth in detail below. Thus, reactions leading to the production of such derivatives can involve substitution on the ferrocenyl group and/or substitution on the phenyl moiety.

Of particular value, however, are those reactions which involve interaction of the lactone grouping. Thus, for example, the lactone ring can be opened readily through hydrolysis in the presence of mineral acids, thus rendering a hydroxyl and a carboxyl group available for further reaction.

A particularly important ring-opening reaction is that by which the above lactone compounds, particularly compound Ia, undergo self condensation, this reaction involving both the ester group and the ferrocenyl moiety. This self-condensation, which can be catalyzed by, e.g., mineral acids or Lewis acids, leads to polymeric products having two types of units represented by formulae II and III below:

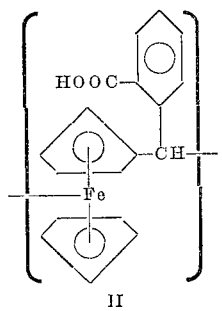

II

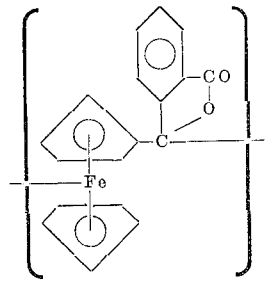

III

In such self-condensation reaction, a large portion, usually the major portion of lactone Ia, is converted to units of the type II above and the remainder, in general approximately ⅓ to ½ of lactone Ia, is converted, through some mechanism as yet not understood by us, to units of the type III noted above, in which the ester grouping remains intact.

Accordingly, the polymers formed by self-condensation of the lactone Ia are believed to have a structure in which recurring units that comprise a free carboxyl group as in Formula II alternate in a random fashion with recurring units that comprise a lactone ring, as in formula III above. The overall polymer structure may hence, in a simplified and schematic form, be depicted by Formula IV below:

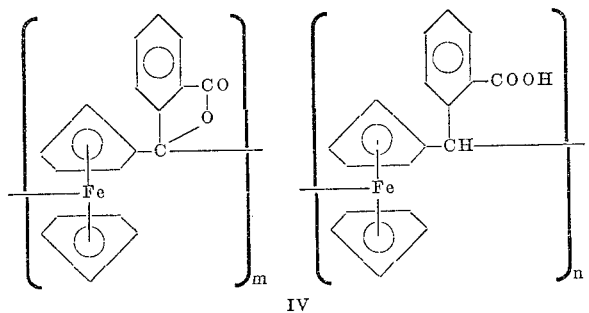

IV

For the purpose of the present invention, structure IV is understood to denote the polymers produced from Ia by self-condensation. In this structure, the units in brackets do not represent bloc-type polymer segments, i.e., segments containing a number of consecutively joined units of the same type, but, as previously indicated, denote polymer chains in which both types of units are arranged randomly, with $m$ and $n$ being positive integers each ranging from 1 to approximately 30, or higher. Thus, the polymers can have a low value for $m$ and $n$, e.g., such that the sum of $m+n$ is from 2 to 4 in the case of oligmers, but the preferred polymers are of higher molecular weight and can have a higher value of $m$ and $n$ such that their sum is of the order of about 6 to about 50. The ratio of $n/m$ can range from about 0.2 to about 4. Generally, $n$ is about equal to, or preferably larger than $m$. Thus, the ratio $n/m$ in general usually ranges from about 0.9 to about 3. The number-average molecular weight, $M_n$, for product IV can range from about 500 to about 10,000, usually from about 1,000 to about 3,000 for preferred fractions, as measured by vapor pressure osmometry.

It will be seen that in such self-condensation reaction of lactone Ia above, not only is the formation of undesirable by-products avoided by the mechanism of the polymerization reaction involving opening of the lactone ring, but this reaction also involves but a single reactant, namely the monomeric material lactone Ia.

In Formulae II to IV above, the centered position of the substituent link or bond on the left hand side in each such formula is understood as denoting a mixed pattern or substitution scheme on the internal ferrocenylene units, with 1,2-, 1,3-, and 1,1'- orientations occurring randomly along the polymer chain, as described in the above copending application Ser. No. 371,732, and which description is incorporated herein by reference.

In the lactone derivatives of the invention the cyclopentadienyl rings of the ferrocene units and also the aromatic, e.g., phenyl ring, of Formulae Ia and II to IV above, can be substituted, for example, by low molecular weight alkyl groups (e.g., methyl, ethyl, propyl, and the like) or aryl groups (e.g., phenyl, naphthyl) or aralkyl groups (e.g., benzyl and phenyl ethyl), or other substituents, preferably those which do not interfere with reactions for opening the lactone ring, the primary functional group of the invention compounds. However, preferably, the only substituents on the cyclopentadienyl rings are the substituted methylene links, e.g., those between adjacent ferrocene units, as noted in Formulae Ia, and II to IV above, and preferably the aromatic rings are unsubstituted except for the lactone ring attached thereto and/or the carboxyl group connected thereto, as noted in Formulae II to IV above.

In accordance with our invention, the 3-ferrocenylphthalide Ia can be prepared from ferrocene and 3-hydroxyphthalide. This latter compound is also known in its open form, phthalaldehydic acid. The reaction between ferrocene and 3-hydroxyphthalide can be carried out in concentrated sulfuric acid medium. A preferred procedure, which gives higher yields, comprises condensation of the two reactants in the melt phase employing an acid catalyst. While any strong mineral acid, e.g., $H_2SO_4$ or HCl can be employed as catalyst, Lewis acids such as aluminum chloride, zinc chloride, or $BF_3$ are usually preferred, with concentrations of such Lewis acids ranging from about 1% to about 50%, preferably about 15% to about 30% by weight of ferrocene. Also, a 3-alkoxyphthalide, wherein the alkoxy group preferably is a lower alkyl group, e.g., containing from 1 to about 4 carbon atoms, such as 3-methoxyphthalide or 3-ethoxyphthalide, can be employed in place of the hydroxyphthalide compound.

The molar ratio ferrocene/hydroxyphthalide (or ferrocene/alkoxyphthalide) can vary between about 0.5 and 2.0. The preferred ferrocene/hydroxyphthalide or ferrocene/alkoxyphthalide molar ratio is in the range from 0.9 to 1.5, with approximately equimolar ratio most desirable. By use of such preferred molar ratios, the formation of 3,3-diferrocenylphthalide, i.e., a compound where the hydrogen of the —CH— group in formula Ia is substituted by the ferrocenyl radical, which tends to form as byproduct in the reaction, can be minimized. The reactants are heated, preferably under nitrogen, at a temperature allowing for quick homogenization of the mixture.

Particularly for molar ratios in the aforementioned ranges, the temperatures of reaction can range broadly from about 65° to as high as about 160° C. Thus, temperatures can range from about 90° to about 160° C., preferably about 105° to about 120° C., for ferrocene-hydroxyphthalide condensations, and from about 65° to about 130° C., preferably about 65° to about 90° C., for ferrocene-alkoxyphthalide condensations. Heating is stopped before noticeable polycondensation, as evidenced by incipient resinification, occurs. Generally, we have found a heating period from 1 to 60 minutes, depending on molar ratio of reactants, catalyst concentration, type of phthalide and temperature employed, to be suitable. The product of the condensation is washed with water to remove catalyst and unreacted phthalide starting material and is then taken up in cyclohexane and chromatographed on activated alumina. In this manner lactone Ia can be separated from the above-noted 3,3-diferrocenylphthalide by-product, and can be further purified by recrystallization.

The 3-hydroxyphthalide reactant used in the above reaction is a well-known compound and is also referred to as phthalaldehydic acid, as was mentioned above. It can be prepared by various conventional procedures. Examples of such preparations are given in U.S. Patents 2,748,161; 2,748,162; 3,016,401, and 2,047,946, as well as in Organic Syntheses, vol. 23, 74 (1943). The 3-alkoxyphthalides alternatively employed in the above reaction are also well known and can easily be prepared by etherification of 3-hydroxyphthalide as described, for example, by Wheeler et al., J. Org. Chem., 22, 547 (1957).

The reaction of ferrocene with 3-hydroxyphthalide leading to Ia can be expressed by the equation below:

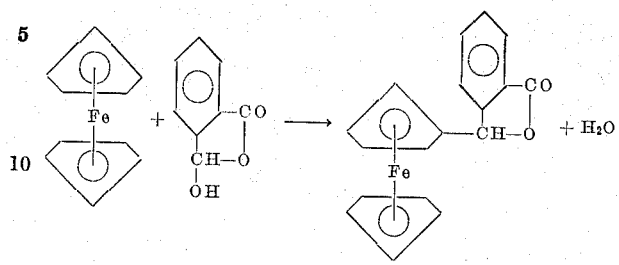

The same course of reaction occurs using a 3-alkoxyphthalide in place of the above-noted 3-hydroxyphthalide, except that an alcohol is eliminated as byproduct instead of water. Thus, using 3-ethoxyphthalide as reactant in the above reaction lactone Ia is formed with the splitting off of ethyl alcohol.

For producing lactone Ib noted above, butyrolactol having the fromula

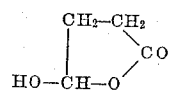

can be reacted with ferrocene under substantially the same reaction conditions with respect to temperatures, molar proportions, presence of acid catalyst and time of reaction, as described above in the process for producing lactone Ia.

Thus, a five membered lactone having the formula

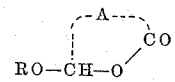

where A has the values defined above and R is hydrogen or an alkyl group, preferably a lower alkyl group of from 1 to about 4 carbon atoms, e.g., methyl, ethyl, and the like, can be used for reaction with ferrocene to produce lactone I of the invention.

In accordance with a further feature of our invention, polymer IV, which is formed by self-condensation of Ia, can be prepared by heating lactone Ia in the melt phase at temperatures ranging from about 115° to about 160° C., preferably about 120° to about 140° C., in the presence of mineral acids or Lewis acids, preferably the latter. Owing to easier dosage and homogenization, coupled with more powerful resulting catalytic effects, Lewis acids such as zinc chloride and aluminum chloride are usually preferred. Catalyst concentrations can be as low as 0.5 and can be increased up to about 20% by weight of starting material or higher, depending on the type of catalyst used. Generally, the range from about 3% to about 10% is preferred. Lower catalyst concentrations may result in undesirably long heating times, whereas with concentrations exceeding the range stated, the chain propagation tends to proceed too fast to allow for sustenance of controlled reaction conditions. It is advantageous to conduct the condensations under a blanket of nitrogen so as to preclude undue oxidation of the ferrocene unit. Heating is generally discontinued when the melt solidifies. The reaction product is washed with water for catalyst removal and is purified by reprecipitation. The main polymer fraction, e.g., with $M_n$ values in the 1000–3000 range, is obtained as a soluble, but infusible, powdery solid which can be cast from solution to form transparent, thin films.

The structure of polymer IV is established on the basis of spectroscopic data and elemental analysis. The fact that, in this polymer, a significant portion of the recurring units lacks the free carboxyl groups present in structure II is established from quantitive measurements of the carboxyl content. The carboxyl content, that is the content of COOH expressed in percent, can be determined by well-known procedures, e.g., by potentiometric titration using alcoholic KOH as titrant. The percent COOH found for various polymers IV generally are in the range from 6% to 8% (as against a calculated range from about 11.8% to 13.3% for a hypothetical polymer composed of only units II in the stated molecular weight range). The presence of units of the Type III is evidenced by the low hydrogen percent content found analytically, coupled with the strong infrared absorption observed at $5.7\mu$, i.e., in the region which is characteristic of 5-membered lactone rings.

Since the aforementioned self-condensation of lactone Ia leading to polymer IV is a comparatively fast reaction, some oligomeric, i.e., low-molecular-weight IV (with $m+n$ ranging from approximately 2 to 4) is always produced simultaneously during the preparation of Ia from ferrocene and the hydroxy- or alkoxyphthalide. This oligomeric IV, which is essentially insoluble in cyclohexane, can easily be separated from the monomeric lactone Ia, since it remains in the cyclohexane-insoluble residue upon cyclohexane extraction of the crude condensation product. Reprecipitation from dioxane solution furnishes the oligomer as a yellow powdery solid.

In accordance with a further feature of the present invention, this oligomer IV, as well as the higher polymer IV described above, both of which, in addition to the same lactone ring as present in Ia, contain free carboxyl groups, can be further reacted with crosslinking agents. Thus, the oligomeric and higher polymeric IV can be reacted with diepoxides to form insoluble, crosslinked resinous products. The oligomer can also be self-condensed in the presence of acidic catalysts to give higher-molecular-weight polymer IV. This self-condensation is preferably carried out by the same procedures as outlined above for the self-condensation of the monomeric lactone Ia.

In accordance with a still further feature of our invention, higher molecular weight polymer IV can also be prepared directly from ferrocene and 3-hydroxyphthalide or a 3 - alkoxyphthalide such as 3 - ethoxyphthalide. This condensation may be conducted in a manner analogous to that described for the self-condensation of Ia. Thus, ferrocene may be heated with 3-hydroxyphthalide in the presence of from about 0.5% to about 20% of a Lewis acid catalyst, preferably aluminum chloride or zinc chloride. The molar ratio of ferrocene/phthalide may vary from about 0.5 to about 2.0. A molar ratio in the range of about 0.9 to about 1.5 is usually preferred, partially about equimolar proportions. While ratios higher than about 2.0 do not offer any special advantages, at ratios below about 0.9 side-reactions gain in importance in which more than the stoichiometric amount of phthalide required for polymer structure IV is involved. Such side-reactions may lead to increasing branching, and as the concentration of phthalide is further increased, to crosslinking.

The reactions can be carried out at temperatures and over reaction periods substantially the same as indicated above for the self-condensation of Ia, and also the work-up procedures employed can be the same. However, owing to the low melting point of the lower alkoxy derivatives (e.g., M.P. 62–64° C. for 3-ethoxy phthalide), it is also possible to employ lower reaction temperatures, e.g., in the range from about 65° to about 100° C. Hence, the temperature range can vary from about 65° to about 160° C., depending on whether a 3-hydroxy- or a 3-alkoxyphthalide is employed.

In the mechanism of the reaction of our invention, particularly for producing compound Ia and polymer IV, the carbonium ion primarily formed from hydroxyphthalide and also from alkoxyphthalide attacks a ferrocene unit to form lactone Ia, which then, depending on the experimental conditions employed, may immediately or slowly react further by self-condensation to give polymer IV.

Due to the well-known stability towards heat and radiation of the ferrocene system, polymer IV which contains such ferrocene units, finds use either per se or upon further reaction with other resinous binder materials, in heat and radiation resistant materials such as coatings, adhesives and sealants. For instance, a representative fraction of polymer IV, with $M_n$ 2900, was subjected to a thermogravimetric analysis test. At a heating rate of 5° C./min., the compound showed relative weight loss figures as low as 25, 35, and 36% at temperatures of 500°, 700° and 900° C., respectively. Polymer IV can also be used as an electron exchange resin, in which the iron nucleus changes from the divalent to the tervalent oxidation state and vice versa. Other applications of polymer IV are as combustion catalysts. In addition, the polymer is useful as an additive in silicone rubber and other elastomers to reduce heat aging. For optical purposes, such as in ultraviolet radiation resistant coatings and window materials, the polymer can be cast from solution into transparent, thin films. Since the method of self-condensation of lactone Ia offers the advantage that polymer IV can be prepared from one single starting material without substantial evolution of volatile matter such as water or alcohols, polymer IV advantageously can be used in such applications in which this one-step resinification is essential, for example, in potting applications.

The following examples, in which all parts are by weight, illustrate practice of the invention:

EXAMPLE I

*Lactone Ia and oligomeric IV by condensation of ferrocene with 3-hydroxyphthalide*

A well-ground mixture of 18.6 parts of ferrocene, 15.0 parts of hydroxyphthalide (phthalaldehydic acid) and 5.6 parts of anhydrous zinc chloride was placed in a vessel equipped with mechanical stirrer. Under a blanket of dry nitrogen, the vessel was briefly heated to 125° C. to cause melting of the reactant mixture. The temperature was then quickly adjusted to 115° C. and there maintained until a sample of the melt, when cooled down to room temperature, showed incipient tackiness and allowed small, fragile strings to be drawn from it (approximately 5–10 minutes). Throughout the condensation, a slow stream of dry nitrogen was passed over the well-agitated melt. The reaction product was thoroughly washed with warm water to remove catalyst and unreacted 3-hydroxyphthalide (5.1 parts). The dried solid was then extracted with boiling cyclohexane. The brown resin insoluble in cyclohexane, 8.5 parts, was reprecipitated from benzene solution (25 parts) by 250 parts of 50% aqueous isopropanol. The resinous deposit was washed with aqueous isopropanol and dried for 12 days at 45° C. under vacuum to give orange-brown, solid, oligomeric IV. By partial concentration of the mother liquor in a rotating evaporator to remove a major portion of the benzene solvent, a second fraction of oligomeric IV deposited in resinous form. Treatment as above yielded the product in solid form. A total of 7.6 parts of combined oligomeric IV, soluble in dioxane, chloroform and benzene, was thus obtained; melting range 85°–120° C. The oligomer showed the analytical data given in Table I below (third line).

The cyclohexane extract of the crude reaction product (see above) was concentrated to 750 parts and was chromatographed on activated alumina, using hexane as eluent. Three major orange-yellow bands were developed. From these, in the sequence of elution, there was obtained 8.3 parts of unreacted ferrocene, M.P. 173°–175° C., 0.2 part of by-product 3,3-diferrocenylphthalide and 3.1 parts of lactone Ia (3-ferrocenylphthalide). For the latter two compounds, which were yellow-to-orange crystalline materials soluble in dioxane, ketones, alcohols and hydrocarbons, the melting points, molecular weights and elemental analytical data are presented in the first two lines of Table I.

TABLE I

| Compound | M.P., °C. | Anal. Calculated (percent) | | | | Mol. Wt. | Anal. Found (percent) | | | | $M_n$ |
| --- | --- | --- | --- | --- | --- | --- | --- | --- | --- | --- | --- |
| | | C | H | Fe | COOH | | C | H | Fe | COOH | |
| Lactone I$a$ | 138–140 | 67.95 | 4.44 | 17.55 | -------- | 318 | 68.12 | 4.39 | 17.96 | -------- | -------- |
| By-product $g$ | 175–177 | 66.97 | 4.42 | 22.24 | -------- | 502 | 66.72 | 4.31 | 22.68 | -------- | -------- |
| Oligomer IV | $b$ 120 | -------- | ---- | ----- | -------- | ----- | 67.70 | 4.11 | 17.89 | 6.5 | $c$ 660 |
| Polymer IV $d$ | -------- | 68.17 | 4.13 | 17.61 | $e$ 7.1 | -------- | 66.56 | 4.12 | 16.30 | 7.2 | $c$ 2,850 |
| Polymer IV $f$ | -------- | ------ | ---- | ----- | -------- | -------- | 67.55 | 4.27 | 15.52 | 6.1 | $c$ 1,750 |

$a$ Determined in benzene solution.
$b$ Upper limit of melting range.
$c$ Determined in pyridine solution.
$d$ Prepared by self-condensation of I$a$.
$e$ Composition calculated for $m=n$.
$f$ Prepared by condensation of ferrocene with 3-hydroxyphthalide.
$g$ 3,3-diferrocenylphthalide.

EXAMPLE 2

*Lactone Ia and oligomeric IV by condensation of ferrocene with 3-ethoxyphthalide*

The mixture of 18.6 parts of ferrocene, 17.8 parts of 3-ethoxyphthalide and 5.5 parts of anhydrous zinc chloride were heated at 70° C. until tests on samples drawn from the melt indicated the end-point as discussed in the preceding example. Work-up as in Example 1 gave 10.4 parts of oligomeric IV, melting range 90°–125° C., with $M_n$ and analyses similar to those found in Example 1. In addition, there were collected from the chromatogram 7.9 parts of unreacted ferrocene and 1.6 parts of lactone I$a$.

EXAMPLE 3

*Polymer IV by self-condensation of lactone Ia*

The well-ground mixture of 35.0 parts of lactone I$a$, as obtained in Example 1, and 2.4 parts of anhydrous zinc chloride was heated at 140° C. with stirring for a period of time long enough for the melt to solidify and thus prevent further stirring. Depending on the batch size, this required from 8 minutes to about 20 minutes. The cold, pulverized melt was thoroughly washed with water to remove the catalyst. After drying the product for 24 hours over $P_2O_5$ under vacuum, it was dissolved in 500 parts of peroxide-free dioxane. The filtered solution was poured into 1800 parts of rapidly stirred, weakly acidified (with HCl) isopropanol containing 30% by volume of water. The yellow-tan solid precipitated was separated by filtration, thoroughly washed with isopropanol and dried for 8 days at 45° C. under vacuum. There was obtained 14.1 parts of polymer IV as a greenish-tan, infusible, powdery solid. Analysis Calculated for IV, assuming $m=n$: C, 68.17; H, 4.13; Fe, 17.61; COOH, 7.1. Found: C, 67.15; H, 4.22; Fe, 17.05; COOH, 7.2; $M_n$, 2200 (pyridine).

From the mother-liquor, combined with the isopropanol washings of the first fraction, an additional, lower-molecular-weight portion of product IV was precipitated by adding excess water. The precipitate was separated by filtration, was washed with 50% aqueous isopropanol, followed by washing with hexane to remove traces of unreacted starting material. The product was then dried for 7 days at 45° C. under vacuum to give 13.2 parts of a yellow powder. This fraction showed the melting range 125°–145° C. Analysis Calculated for IV, assuming $m=n$: C, 68.17; H, 4.13; Fe, 17.61; COOH, 7.1. Found: C, 67.71; H, 4.11; Fe, 17.89; COOH, 6.4; $M_n$, 680 (pyridine).

Both fractions were very soluble in pyridine, N-methylpyrrolidone, dibromomethane, cyclohexanone and tetramethylenesulfone; they were partially soluble in benzene and insoluble in water. Films could be cast or sprayed from these solutions. The lower-molecular-weight fraction could also be cast from the melt.

A sample of the first fraction could be subfractionated in the conventional manner by fractional precipitation using cyclohexanone as solvent and benzene-methanol as precipitant. For subfractions thus obtained $M_n$ can range from about 700 to about 10,000.

EXAMPLE 4

*Polymer IV by self-condensation of lactone Ia*

The same procedure was carried out as in the preceding example, except that the catalyst was anhydrous aluminum chloride (1.1 parts). The polymer obtained (total: 16.6 parts) corresponded in composition and properties to that described in Example 3. For the higher-molecular-weight fraction, the analytical results are listed in the fourth line of Table I.

EXAMPLE 5

*Polymer IV by condensation of ferrocene with 3-hydroxyphthalide*

The well-ground mixture of 27.9 parts of ferrocene, 15.0 parts of 3-hydroxypthalide and 1.4 parts of anhydrous zinc chloride was heated with stirring at 110° C. under a blanket of dry nitrogen until the mass had nearly solidified and further stirring was no longer possible, which required about 2 hours. Work-up as described in Example 3 furnished 9.7 parts of a higher-molecular-weight fraction of polymer IV, infusible up to 300° C., and 13.7 parts (after removal of admixed ferrocene by vacuum sublimation) of a lower molecular-weight fraction, melting range 90°–120° C. For the former, the analytical data are given in the last line of Table I. The corresponding data for the latter fraction were as follows: Analysis Calculated for IV: C, 68.17; H, 4.13; Fe, 17.61; COOH, 7.1. Found: C, 68.37; H, 4.23; Fe, 15.90; COOH, 6.3; M, 780 (pyridine). Solubility and film forming properties were the same as noted in Example 3.

EXAMPLE 6

*Polymer IV by condensation of ferrocene with 3-hydroxyphthalide*

The procedure was carried out in the same manner as described in the preceding example, except that the catalyst employed was anhydrous aluminum chloride (1.0 part). The total amount of polymer IV obtained was 20.5 parts. The higher-molecular-weight fraction exhibited an $M_n$ value of 2380 (pyridine) and gave the following analytical results: C, 65.38; H, 4.26; Fe, 14.82: COOH, 6.4.

EXAMPLE 7

*Polymer IV by condensation of ferrocene with 3-ethoxyphthalide*

The well-ground mixture of 22.0 parts of ferrocene, 17.8 parts of 3-ethoxyphthalide and 2.7 parts of anhydrous zinc chloride were heated at 100° C. with stirring under dry nitrogen, until the mass had solidified so as to block the stirrer. Th reaction product was worked up in the manner described in Example 5. From the second precipitate, admixed ferrocene was removed by vacuum sublimination. There was obtained a total of 22.8 parts of polymer IV as two fractions, which exhibited the same solubility behavior and essentially the same analytical data as did the fractions obtained in Example 5.

EXAMPLE 8

*Polymer IV by condensation of ferrocene with 3-ethoxyphthalide*

The mixture of 18.6 parts of ferrocene, 17.8 parts of 3-ethoxyphthalide and 6.2 parts of an 18% aqueous hydrochloric acid was treated as described in the preceding example, employing a reaction temperature of 110° C. and a total heating time of approximately 10 hours. After the first six hours, an additional 6.2 parts of 18% aqueous hydrochloric acid were added. Work-up as described in Example 5 resulted in isolation of two fractions of polymer IV, together totaling 16.8 parts, with analytical data comparable to those given for polymer IV in the preceding examples, except that the number-average molecular weights were lower. Thus, the combined two fractions showed the $M_n$ value 820.

EXAMPLE 9

*Polymer IV by self-condensation of oligomeric IV*

The well-ground mixture of 5.0 parts of oligomeric IV obtained in Example 1 and 0.2 part of anhydrous zinc chloride was heated as in Example 3. Work-up was also accomplished in the manner described in Example 3. There was thus obtained as two fractions a total of 4.2 parts of polymer IV. The first, higher-molecular fraction was infusible up to 300° C. and exhibited and $M_n$ value of 2470. Solubility behavior and elemental analytical data of both fractions were comparable to those of corresponding fractions of polymer IV described in the preceding examples.

EXAMPLE 10

*Curing of oligomeric IV by means of a diepoxide*

Twelve parts of the oligomeric, i.e., low-molecular-weight product IV obtained in Example 1 were mixed with 10 parts of the diglycidyl ether of 2,2-bis(4-hydroxyphenyl) propane as commercially available, e.g., as Epon 828 (Shell Chemical Co.). The mixture was homogenized at 85° C. and was cured at this temperature for 12 hours, followed by curing at 100° C. for 4 hours. The resin was then post-cured at 140° C. for 17 hours. There was thus obtained a dark-colored, hard resin infusible and insoluble in all common organic solvents.

EXAMPLE 11

*Crosslinking of polymeric IV by means of a polyepoxide*

Six parts of the first, i.e., higher-molecular-weight fraction of polymer IV obtained in Example 5, exhibiting an $M_n$ value of 1750, were intimately mixed at 50° C. with 12 parts of a low-molecular-weight epoxynovolac resin and 3 parts of methyl-endo-methylene-hexahydrophthalic anhydride. The epoxy-novolac resin was the glycidyl ether of a phenolic novolac as commercially available, e.g., under the trade name DEN 438 (Dow Chemical Co.). The mixture was cured for 6 hours at 100° C. and 4 hours at 150° C., followed by a post-curing treatment of 2 hours at 180° C. The resulting product was a hard, tough, infusible resin which could be polished and machined.

EXAMPLE 12

*Film formation from polymer IV*

A sample of polymer IV, obtained in Example 5 and the data for which is recorded in the bottom line of Table I, was dissolved in cyclohexanone so as to give a 7% solution (by weight). Using a commercially available spray gun, for example, a Brinks Model 15 spray gun with No. 77 fluid nozzle, at 45 p.s.i. air stream pressure, this solution was sprayed onto a quartz window of 1 inch diameter. By repeated spray application in the manner indicated, a transparent film was deposited onto the window, which was dried for 24 hours at 40° C. under nitrogen, followed by 12 hours at the same temperature under vacuum. The film thickness ranged from about 0.001 to 0.020 inch, depending on the number of coatings applied. Placed between quartz windows or other suitable materials, the film can be used as ultraviolet absorbing component in multi-layer transparent window systems.

EXAMPLE 13

*Film formation from oligomeric IV*

A 0.05 gram sample of oligomeric IV as obtained in Example 1 and the data for which are recorded in the third line of Table I was placed onto a quartz window of 1 inch diameter. After covering with a second window of equal size, the "sandwich" was heated under nitrogen to 125° C., until the material had completely fused. Slight pressure was applied to the upper window so as to allow the melt to occupy uniformly the interspace between the windows. A 0.01 inch shim was used for thickness control. After cooling to room temperature, there was thus obtained a transparent film "sandwiched" between the quartz plates. This composite system can be used as an ultraviolet absorbing window transparent to visible light.

From the foregoing, it is seen that the invention provides a class of novel monomeric ferrocene compounds and novel ferrocene polymers both containing the lactone ring, such monomeric compounds readily undergoing self-condensation to form the corresponding polymers without the splitting off of any undesirable byproducts, such monomeric compounds and polymers having wide utility and being further capable of reaction with other materials, particularly by the reaction of such polymers with epoxy compounds containing the reactive epoxide group, said polymers thus functioning as curing and hardening agents for such epoxy compounds.

For purposes of simplicity in the claims, the term "Fc" is intended to denote the ferrocenyl radical present in Formulae I, Ia and Ib, and the expression "Fc'" is intended to denote the ferrocenylene radical present in the structural Formulae II, III and IV, such ferrocenyl and ferrocenylene radicals being set forth below:

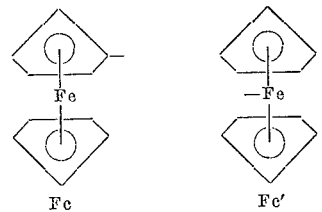

While we have described particular embodiments of our invention for the purpose of illustration, it should be understood that various modifications and adaptations thereof may be made within the spirit of the invention, within the scope of the appended claims.

We claim:

1. A polymeric product containing recurring units B and C arranged randomly in a polymeric chain and having the formula

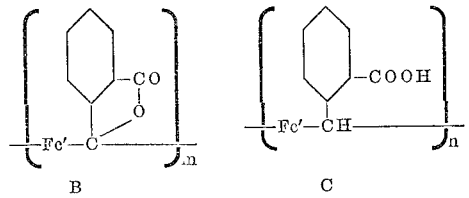

where Fc' is the ferrocenylene radical, and $m$ and $n$ are positive integers each ranging from 1 to about 30, the ratio $n/m$ ranging from about 0.2 to about 4.

2. A polymeric product as defined in claim 1, wherein the ratio of $n/m$ ranges from about 0.9 to about 3, and the number-average molecular weight ranges from about 500 to about 10,000 as measured by vapor pressure osmometry.

3. A polymeric product as defined in claim 2, wherein $n$ is approximately equal to $m$, and said number-average molecular weight ranges from about 1,000 to about 3,000.

4. A polymeric product as defined in claim 1, wherein the sum of $m$ and $n$ ranges from about 6 to about 50, and said number-average molecular weight ranges from about 1,000 to about 3,000.

5. A polymeric product as defined in claim 4, wherein $n/m$ ranges from about 0.9 to about 3.

6. An oligomeric product as defined in claim 1, wherein $n+m$ ranges from about 2 to 4.

7. A polymeric product as defined in claim 6, wherein $n/m$ ranges from about 0.9 to about 3.

8. The crosslinked product of a polymeric product as defined in claim 1, with an epoxy compound having more than one 1,2-epoxy group per molecule.

9. The crosslinked product of a polymer as defined in claim 4, with an epoxy compound having more than one 1,2-epoxy group per molecule.

10. The crosslinked product of a polymer as defined in claim 6, with an epoxy compound having more than one 1,2-epoxy group per molecule.

11. The process which comprises reacting at elevated temperature a member selected from the group consisting of 3-hydroxy phthalide and a 3-alkoxyphthalide, with ferrocene, in the presence of an acidic catalyst, employing a molar ratio of ferrocene to said member ranging between about 0.5 and 2.0.

12. The process which comprises reacting at elevated temperature a member selected from the group consisting of 3-hydroxy phthalide and a 3-alkoxyphthalide, said alkoxy group being a lower alkoxy group, with ferrocene, in the presence of an acidic catalyst, employing a molar ratio of ferrocene to said member ranging between about 0.5 and about 2.0, said temperature ranging from about 65° to about 160° C., discontinuing heating before noticeable polycondensation occurs, and recovering a product containing 3-ferrocenylphthalide.

13. The process which comprises heating at temperature ranging from about 65° C. to about 160° C., a member selected from the group consisting of 3-hydroxyphthalide and a 3-alkoxyphthalide, said alkoxy group being a lower alkoxy group, with ferrocene, in the presence of an acidic catalyst, employing a molar ratio of ferrocene to said member ranging between about 0.5 and about 2.0, continuing heating for a period sufficient to cause polymerization, and recovering a polymeric product containing recurring ferrocene units.

14. The process which comprises heating in the melt phase at temperature ranging from about 65° C. to about 160° C., a member selected from the group consisting of 3-hydroxy phthalide and a 3-alkoxyphthalide, said alkoxy group being a lower alkoxy group, with ferrocene, in the presence of a Lewis acid in a concentration ranging from about 1 to about 50% by weight of ferrocene, employing a molar ratio of ferrocene to said member ranging between about 0.5 and about 2.0, continuing heating for a period sufficient to cause polymerization, and recovering a polymeric product as defined in claim 1.

15. The process as defined in claim 14, said member being 3-hydroxy phthalide, said heating being carried out at temperature of about 90° to about 160° C., and employing a molar ratio of ferrocene to 3-hydroxyphthalide ranging from about 0.9 to about 1.5.

16. The process as defined in claim 14, said member being a 3-alkoxy phthalide, said alkoxy group being a lower alkoxy group, said heating being carried out at temperature of about 65° to about 130° C., and employing a ratio of ferrocene to 3-alkoxy phthalide ranging from about 0.9 to about 1.5.

17. The process which comprises heating 3-ferrocenyl phthalide in the melt phase in the presence of a Lewis acid in a concentration ranging from about 0.5% to about 20% by weight of said 3-ferrocenyl phthalide, at temperature ranging from about 115° to about 160° C., and recovering a polymeric product as defined in claim 1.

18. The process which comprises heating the oligomeric product defined in claim 6, in the presence of a Lewis acid in a concentration ranging from about 0.5% to about 20% by weight of said oligomeric product, and recovering a polymeric product having recurring ferrocene units and of higher molecular weight than said oligomeric product.

References Cited

Sugiyama, Bulletin of the Chemical Society of Japan, 35, 767–9, March 1962.

V. D. Chevskaya Dolkady Akad Nauk, SSSR, 138, 390–2, May 1961.

MURRAY TILLMAN, *Primary Examiner.*

P. LIEBERMAN, *Assistant Examiner.*